United States Patent
Kovacik et al.

(10) Patent No.: US 10,494,941 B2
(45) Date of Patent: Dec. 3, 2019

(54) SEAL FACE PLATE COOLING

(71) Applicant: United Technologies Corporation, Farmington, CT (US)

(72) Inventors: Ronnie K. Kovacik, Manchester, CT (US); Kevin Duffy, Hartford, CT (US); Brady Walker, Glastonbury, CT (US); Antonio F. Artiles, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 262 days.

(21) Appl. No.: 15/294,923

(22) Filed: Oct. 17, 2016

(65) Prior Publication Data
US 2018/0106157 A1   Apr. 19, 2018

(51) Int. Cl.
| | | |
|---|---|---|
| *F01D 11/00* | (2006.01) | |
| *F01D 25/12* | (2006.01) | |
| *F16J 15/16* | (2006.01) | |
| *F16J 15/34* | (2006.01) | |
| *F16J 15/447* | (2006.01) | |

(52) U.S. Cl.
CPC ............ *F01D 11/003* (2013.01); *F01D 25/12* (2013.01); *F01D 25/125* (2013.01); *F16J 15/162* (2013.01); *F16J 15/342* (2013.01); *F16J 15/3404* (2013.01); *F16J 15/4476* (2013.01); *F05D 2220/32* (2013.01); *F05D 2240/55* (2013.01); *F05D 2260/232* (2013.01); *F05D 2300/224* (2013.01); *Y02T 50/675* (2013.01)

(58) Field of Classification Search
CPC ...... F01D 11/003; F01D 25/12; F01D 25/125; F05D 2220/32; F05D 2260/232; F05D 2240/55; F05D 2300/224; F16J 15/162; F16J 15/3404; F16J 15/342; F16J 15/4476; Y10T 50/675
USPC ......................................................... 277/500
See application file for complete search history.

(56) References Cited

U.S. PATENT DOCUMENTS

| | | | |
|---|---|---|---|
| 2,634,907 A | | 4/1953 | Smith |
| 2,908,516 A | | 10/1959 | Stein |
| 3,124,502 A | * | 3/1964 | Radke ...................... F16J 15/20 |
| | | | 277/536 |
| 3,917,288 A | * | 11/1975 | Huber .................. F16J 15/3412 |
| | | | 277/368 |
| 4,017,397 A | | 4/1977 | Copeland |
| 4,131,391 A | | 12/1978 | Robinson |
| 4,137,173 A | | 1/1979 | Jarvis |

(Continued)

OTHER PUBLICATIONS

Anoop Kumar Somanchi, "A Novel Mechanical Seal Design With Superior Thermal Characteristics", A Thesis Submitted to The Graduate Faculty of the Louisiana State University Agricultural and Mechanical College, available from <http://etd.lsu.edu/docs/available/etd-07082004-095554/unrestricted/Somanchi_thesis.pdf>, Aug. 2004.

(Continued)

*Primary Examiner* — Nathan Cumar
(74) *Attorney, Agent, or Firm* — O'Shea Getz P.C.

(57) ABSTRACT

Aspects of the disclosure are directed to a sealing system for an engine having an axial centerline, comprising: a stationary carbon segment, and a seal plate that rotates when the engine is operated, where the seal plate includes an end face that is opposed to an interface between the carbon segment and the seal plate, and where the end face includes at least one groove that conveys a liquid cooling fluid.

2 Claims, 10 Drawing Sheets

(56) References Cited

U.S. PATENT DOCUMENTS

| | | | | |
|---|---|---|---|---|
| 4,212,475 | A | * | 7/1980 | Sedy ............... F16J 15/3412 277/400 |
| 4,389,052 | A | | 6/1983 | Shimizu |
| 5,135,235 | A | * | 8/1992 | Parmar ............ F16J 15/3468 277/360 |
| 5,639,096 | A | * | 6/1997 | Ullah ............... F16J 15/3404 277/401 |
| 5,795,074 | A | * | 8/1998 | Rahman ............ F16C 17/045 384/121 |
| 6,877,950 | B2 | | 4/2005 | Liu |
| 8,167,314 | B2 | | 5/2012 | Ullah |
| 8,777,229 | B2 | | 7/2014 | Davis |
| 8,820,752 | B2 | | 9/2014 | Garrison |
| 2005/0047912 | A1 | | 3/2005 | Giesler et al. |
| 2006/0239816 | A1 | * | 10/2006 | Labbe ............... F01D 11/003 415/230 |
| 2014/0144121 | A1 | * | 5/2014 | Legare ............... F02C 7/06 60/39.08 |
| 2014/0286599 | A1 | * | 9/2014 | Devitt ............... F16C 32/0618 384/101 |
| 2015/0275761 | A1 | | 10/2015 | Duffy et al. |
| 2016/0010477 | A1 | | 1/2016 | Maret et al. |

OTHER PUBLICATIONS

EP search report for EP17196241.8 dated May 2, 2018.

* cited by examiner

SEAL FACE PLATE COOLING

BACKGROUND

Gas turbine engines, such as those which power aircraft and industrial equipment, employ a compressor to compress air that is drawn into the engine and a turbine to capture energy associated with the combustion of a fuel-air mixture. Seals are used in engines to isolate a fluid from one or more areas/regions of the engine. For example, seals control various parameters (e.g., temperature, pressure) within the areas/regions of the engine and ensure proper/efficient engine operation and stability.

Figure 2A:
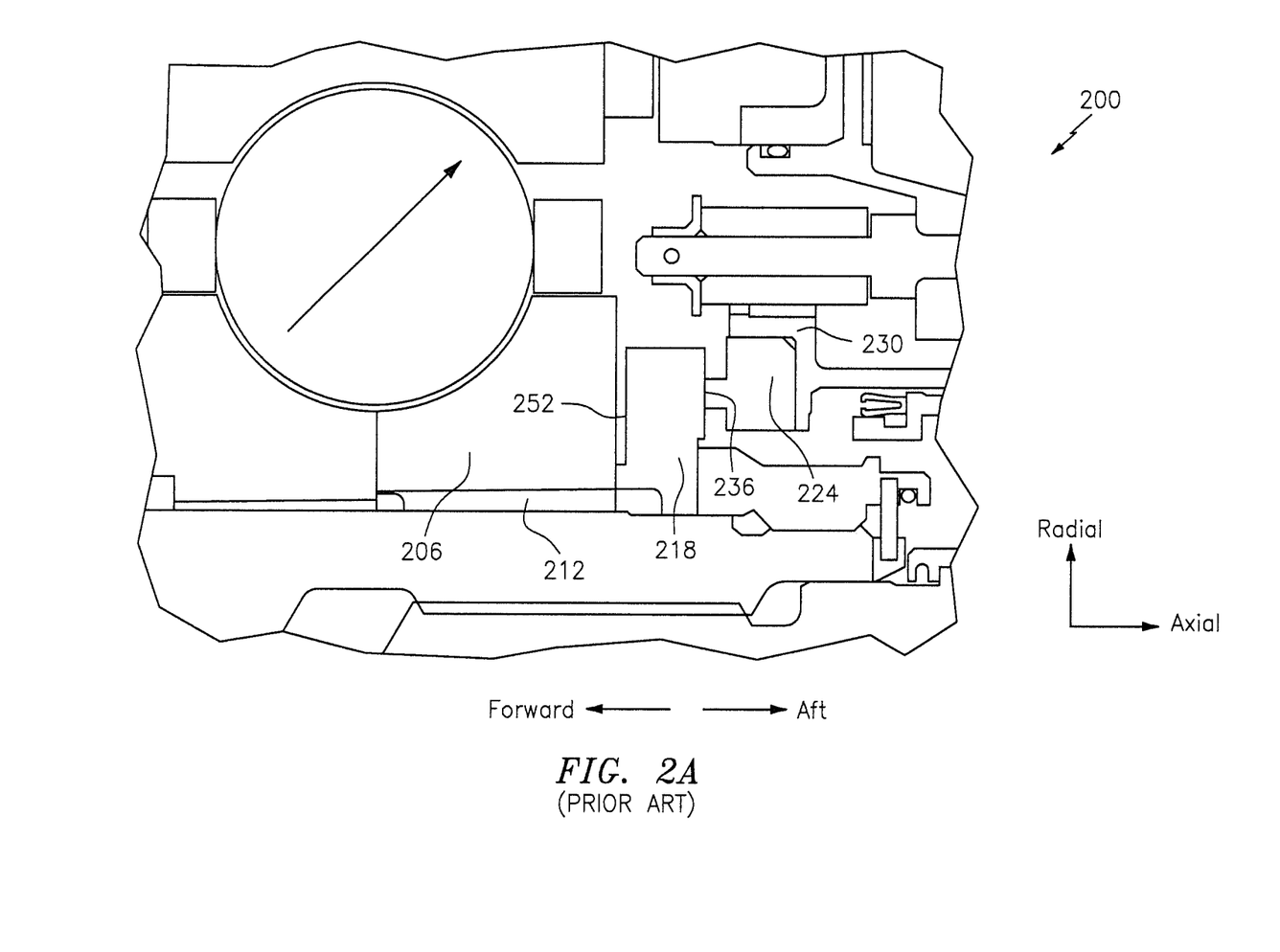
FIG. 2A illustrates a prior art sealing system.

Referring to FIG. 2A, a prior art sealing system 200 of an engine is shown. The system 200 is shown as including a bearing ring 206, a distribution feature 212, a seal plate 218, a carbon segment 224, and a carrier 230. The bearing ring 206 may be part of a larger bearing system/compartment that may support rotational hardware of the engine. The carrier 230 may support the carbon segment 224.

The seal plate 218 is configured to rotate, whereas the carbon segment 224 is a stationary structure. In this respect, an interface 236 between the seal plate 218 and the carbon segment 224 may be subject to heat/thermal loads that need to be managed. Opposed to, and axially forward of the interface 236 is a planar end face 252 of the seal plate 218. The distribution feature 212 is used to convey oil to the seal plate 218 to cool the seal plate 218 in support of such thermal management. The seal plate 218 includes radially-oriented holes 258 (see FIG. 2B) that cool the seal plate 218 at discrete locations around the circumference of the seal plate 218. The oil is ejected radially outward/outboard from the seal plate 218 via the holes 258.

Figure 2B:
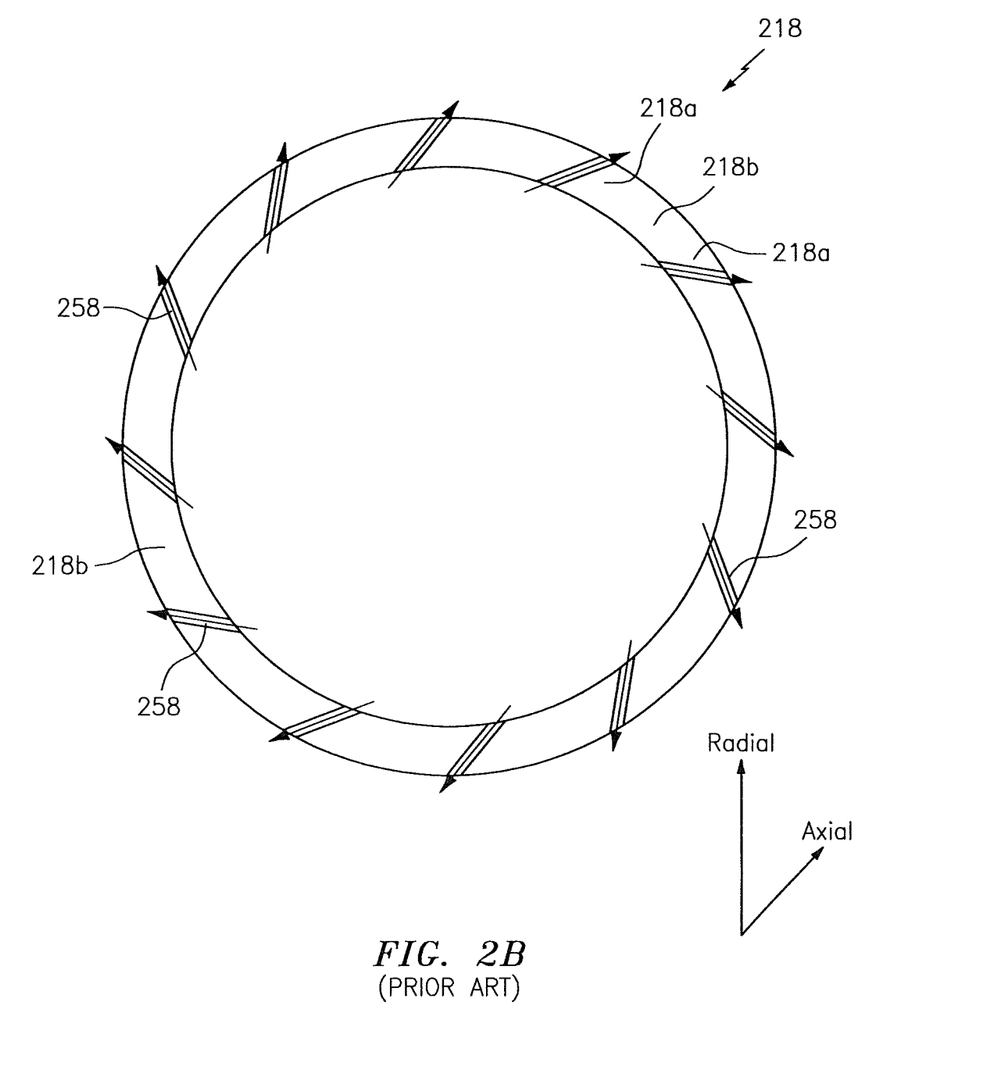
FIG. 2B illustrates a prior art seal plate of the system of FIG. 2A that incorporates radially-oriented holes.

The holes 258 have a relatively small surface area for the cool oil to draw heat away from the seal plate 218. The oil passes through the holes 258 quickly, with minimal time for the oil to cool the seal plate 218. Moreover, the use of the holes 258 provides for cooling at discrete locations on the seal plate 218. For example, and as best seen in FIG. 2B, those portions 218a of the seal plate 218 that are proximate to the holes 258 may tend to be cooler than those portions 218b of the seal plate 218 that are further from the holes 258, such that the seal plate 218 may be subject to waviness/lack of uniformity due to variations in a distance of locations/portions of the seal plate 218 relative to the holes 258.

Bearing compartment heat generation, which is influenced by oil flow rate, necessitates the use of fuel/oil and air/oil heat exchangers. For example, in order to cool the hardware as described above, relatively large oil flow rates may be needed in order to continue circulating cool oil to, e.g., the seal plate 218. The oil flow rates that are used dictate the sizes of an oil pump, tubes, and an oil tank. For example, the use of a large oil flow rate may result in the use of large oil pumps, tubes, and oil tanks. An increase in the size of the oil pumps, tubes, and oil tanks increases the weight of the engine, which has a negative impact on engine efficiency/performance.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a sealing system for an engine having an axial centerline, comprising: a stationary carbon segment, and a seal plate that rotates when the engine is operated, where the seal plate includes an end face that is opposed to an interface between the carbon segment and the seal plate, and where the end face includes at least one groove that conveys a liquid cooling fluid. In some embodiments, the cooling fluid includes oil. In some embodiments, the at least one groove includes a plurality of grooves formed between a plurality of fins, and where the grooves and fins are formed in an alternating sequence. In some embodiments, each of the fins consumes approximately fifty degrees of the circumference of the end face. In some embodiments, the end face has a substantially constant groove width to pitch ratio over a radial span of the end face. In some embodiments, the end face has a variable groove width to pitch ratio over a radial span of the end face. In some embodiments, the groove width to pitch ratio increases from an inner diameter of the end face towards an outer diameter of the end face. In some embodiments, at least one groove is oriented in a first direction in traversing the groove from an inner diameter of the end face towards an outer diameter of the end face, and where the seal plate rotates in a second direction when the engine is operated. In some embodiments, the first direction is different from the second direction. In some embodiments, the system further comprises a carrier that supports the carbon segment, a bearing ring that supports rotational hardware of the engine, the rotational hardware including the seal plate, and a distribution feature that provides the cooling fluid to the seal plate. In some embodiments, the at least one groove includes a plurality of grooves formed between a plurality of fins, and where at least one of the fins is saw-tooth shaped. In some embodiments, the at least one groove includes a plurality of grooves formed between a plurality of fins, and where at least one of the fins is L-shaped. In some embodiments, the end face includes a tapered profile. In some embodiments, an outermost radial end of the end face is located axially forward of an innermost radial end of the end face. In some embodiments, the end face is located axially forward of the interface between the carbon segment and the seal plate. In some embodiments, the at least one groove includes a plurality of grooves formed between a plurality of fins, and where the grooves and fins are continuous loops around a circumference of the end face.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to sealing environments/applications. In some embodiments, an external surface/end face of a seal plate may include one or more cooling fins and/or grooves. The use of the cooling fins/grooves may define a path for a cooling fluid (e.g., oil) to travel, where the use of the cooling fluid may remove heat from the seal plate.

Figure 1:
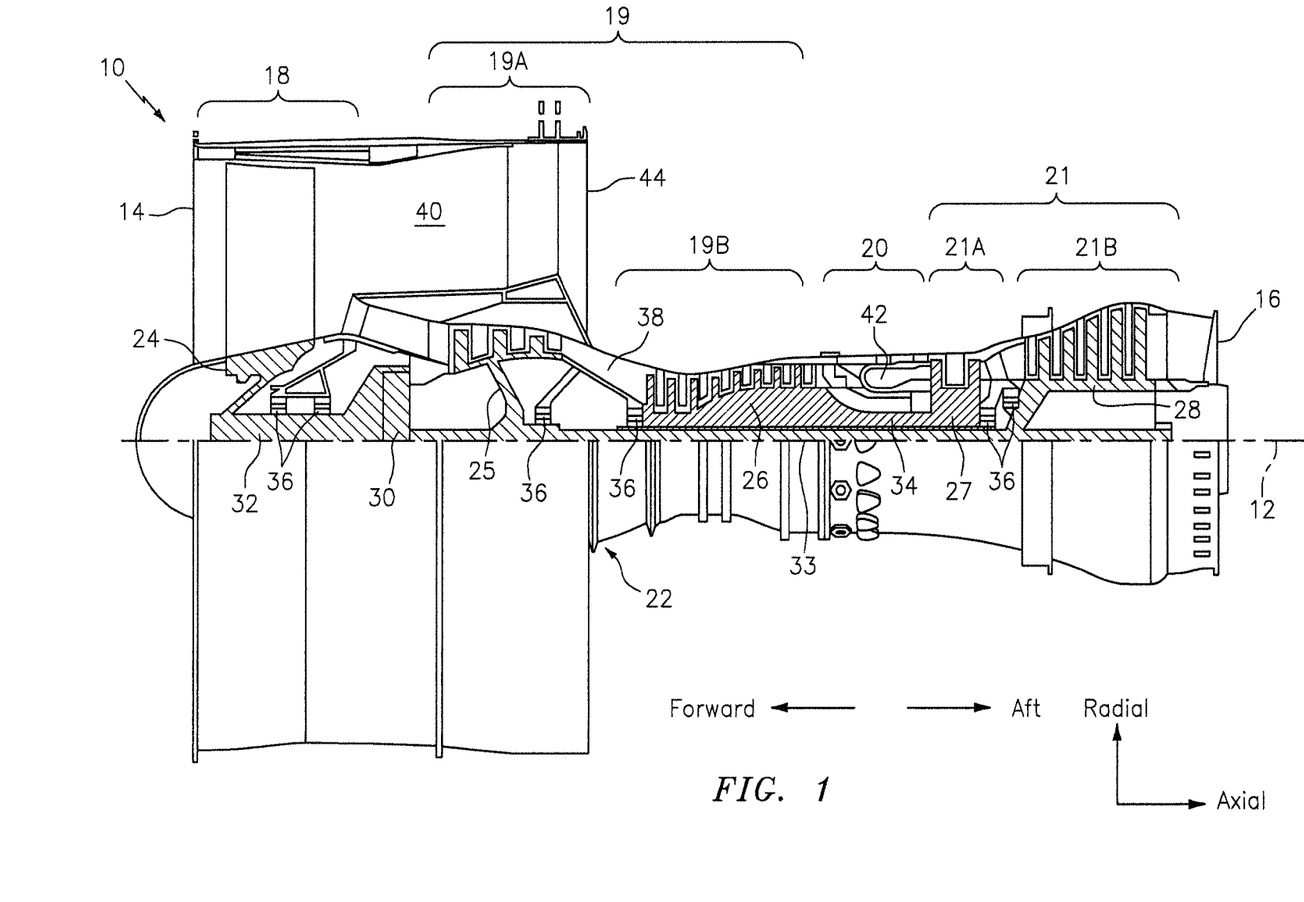
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3A:
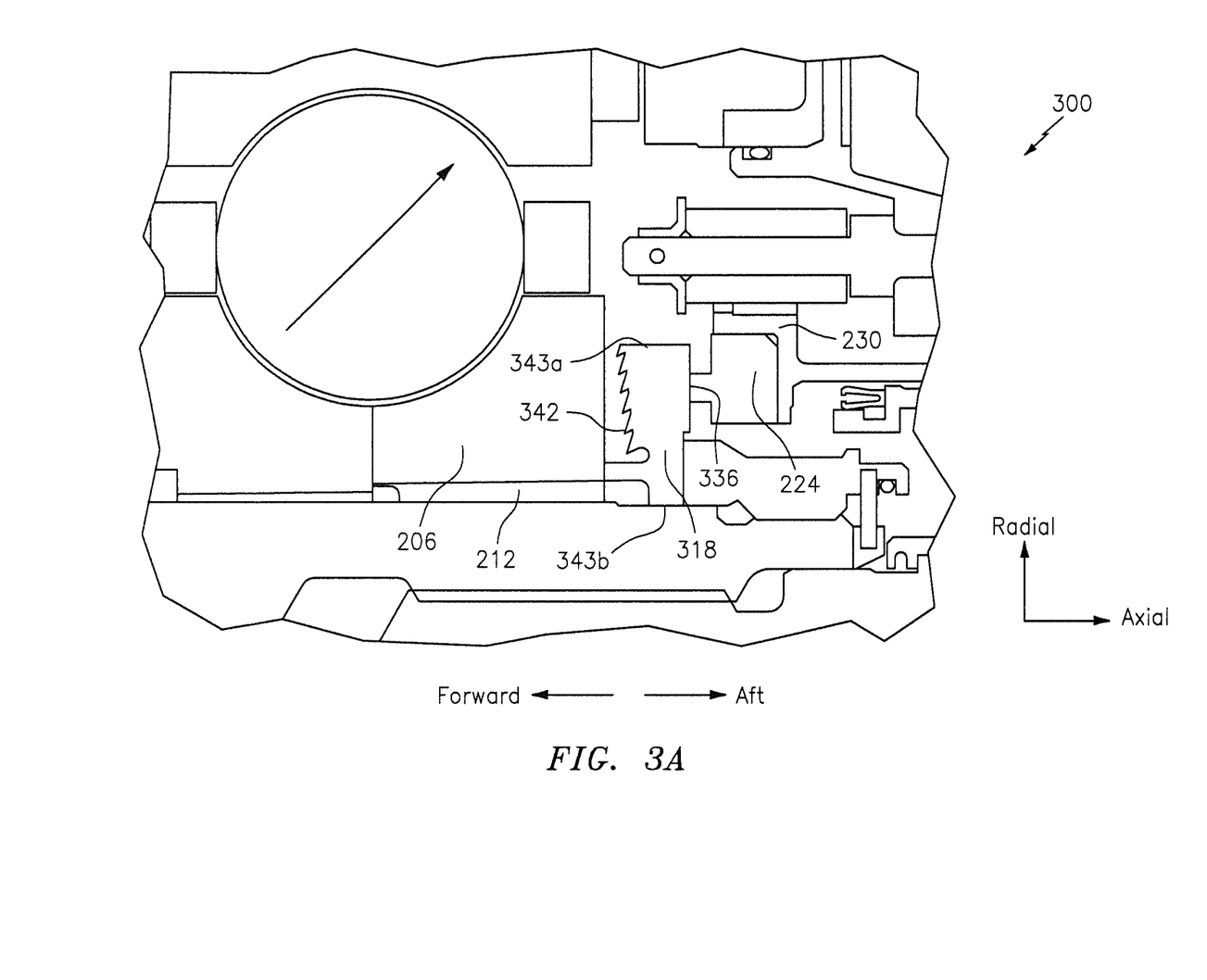
FIG. 3A illustrates a sealing system including a seal plate with an end face.

Referring to FIG. 3A, a sealing system 300 is shown. The system 300 may include a seal plate 318. The seal plate 318 may interface to the carbon segment 224 at an interface 336. The interface 336 may tend to get hot, such that a cooling fluid (e.g., oil) may be supplied to the seal plate 318 to remove some of the heat from the seal plate 318. For example, the seal plate 318 may receive a cooling fluid from the distribution feature 212.

As shown in FIG. 3A, a (forward) surface/end face 342 of the seal plate 318 may include features that assist in the cooling/removal of heat from the seal plate 318 as described further below. The end face 342 and the interface 336 are on opposite sides of the seal plate 318.

Additionally, the end face 342 is shown in FIG. 3A as including a tapered profile, where the outermost radial end 343a of the end face 342 is located axially forward of the innermost radial end 343b of the end face 342. In some embodiments, such a taper might not be included such that the outermost radial end 343a of the end face 342 may be located in substantially the same axial plane/station as the innermost radial end 343b of the end face 342. In some embodiments, the taper may progress in a direction that is opposite from what is shown in FIG. 3A; for example, the outermost radial end 343a of the end face 342 may be located axially aft of the innermost radial end 343b of the end face 342 in some embodiments. Referring to FIG. 3I, a particular angle/degree of taper that may be used is shown, where relative to an axial station/plane 344 a portion of an end face 362 (where the end face 362 may correspond to the end face 342 of FIG. 3A) is shown as being inclined by an amount denoted by an angle 346. The inclination may help to ensure that cooling fluid does not separate from the end face 342/362 before reaching an outer diameter of the end face 342/362, thus promoting heat transfer.

Figure 3B:
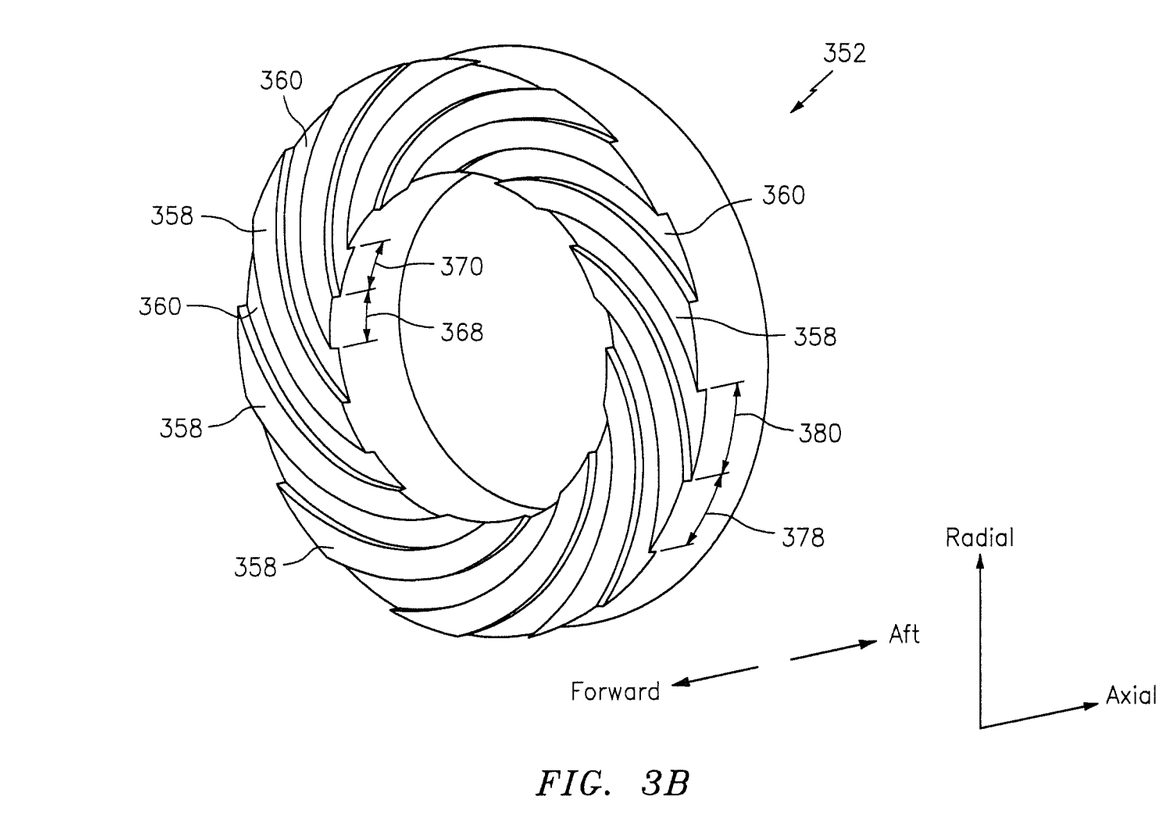
FIG. 3B illustrates an embodiment of an end face that incorporates one or more fins and grooves with the fins and grooves having a constant groove width to pitch ratio.

An end face 352 (where the end face 352 may correspond to the end face 342 of FIG. 3A) of an exemplary embodiment is shown in FIG. 3B. In particular, the end face 352 of FIG. 3B is shown as including one or more ridges/fins 358 arranged in an alternating sequence with respect to one or more recesses/grooves 360 that may be used in the conveyance of a cooling fluid. The grooves 360 may be obtained by, e.g., machining/milling the seal plate 318 (see FIG. 3A). Other techniques, such as for example chemical etching, electrical discharge machining (EDM)/additive manufacturing/machining, etc., may be used to manufacture the end face 352.

In contrast to the use of the radial holes 258 of FIG. 2B, the use of the fins 358 and grooves 360 may tend to pool the cooling fluid in the grooves 360 and may serve to extend the time/distance that the cooling fluid remains engaged with the seal plate 318 before being ejected from the seal plate 318 (where such ejection may be based on a centrifugal force imparted on the cooling fluid). Additionally, a channeling of the cooling fluid in the grooves 360 may provide for an increased surface area for the cooling fluid to contact the seal plate 318. In this respect, for a given set of an oil pump, tubes, and oil tank, the arrangement of FIGS. 3A-3B may provide enhanced cooling efficiency/performance relative to the arrangement shown in FIGS. 2A-2B. Additionally, the use of the fins 358 and grooves 360 as shown in FIG. 3B may provide for cooling over the entire circumference of the seal plate 318 (as opposed to just at discrete, circumferential locations that are proximate the radial holes 258 as in FIG. 2B).

While the embodiment shown in FIG. 3B includes multiple fins 358 and grooves 360 (also referred to herein as an end face 352 including multiple starts) with each fin 358 consuming approximately fifty degrees of the overall circumference of the end face 352, in some embodiments a single fin 358 (or analogously, groove 360) may be used (where that single fin 358 may consume the three-hundred sixty degree circumference of the end face 352). More generally, any number of fins 358 or grooves 360 may be included in a given embodiment.

As shown in FIG. 3B, the fins 358 and the grooves 360 may be oriented in a clockwise direction in terms of travel/progression along a given fin 358/groove 360 from the inner diameter of the end face 352 to the outer diameter of the end face 352. In some embodiments, the fins 358 and the grooves 360 may be oriented in a counterclockwise direction in terms of travel/progression along a fin 358/groove 360 from the inner diameter of the end face 352 to the outer diameter of the end face 352.

In some embodiments, the particular orientation (e.g., clockwise or counterclockwise as described above) for the fins 358/grooves 360 may be selected to be opposite to the direction of the rotation of the seal plate 318. For example, from the perspective of looking forward-to-aft as shown in FIG. 3B, the clockwise orientation (progressing from the inner diameter to the outer diameter of the end face 352) of the fins 358/grooves 360 may coincide with a counterclockwise rotation of the end face 352/seal plate 318 when the associated engine is operated. Having an orientation of the fins 358/grooves 360 different from a direction of rotation of the end face 352/seal plate 318 may serve to entrap/entrain the cooling fluid for a longer period of time than if the orientation of the fins 358/grooves 360 was in the same direction as the direction of rotation of the end face 352/seal plate 318, thereby enhancing the cooling efficiency/performance.

As shown in FIG. 3B, at the inner diameter of the end face 352 the fins 358 may have a circumferential width as denoted by arrow 368 and the grooves 360 may have a circumferential width as denoted by arrow 370. Similarly, at the outer diameter of the end face 352 the fins 358 may have a circumferential width as denoted by arrow 378 and the grooves 360 may have a circumferential width as denoted by arrow 380.

As used herein, the term "pitch" may refer to the distance of a repeatable pattern. For example, in the context of the widths 368 and 370, the summation of the widths 368 and 370 represents the pitch as measured at the inner diameter of the end face 352 in FIG. 3B. Similarly, the summation of the widths 378 and 380 represents the pitch as measured at the outer diameter of the end face 352 in FIG. 3B.

In FIG. 3B, a constant "groove width to pitch ratio" is shown over the radial span of the end face 352. For example, the width 370 divided by the summation of the widths 370 and 368 is the same as the width 380 divided by the summation of the widths 380 and 378. In the embodiment shown in FIG. 3B, the groove width to pitch ratio may be approximately equal to 50%.

Figure 3C:
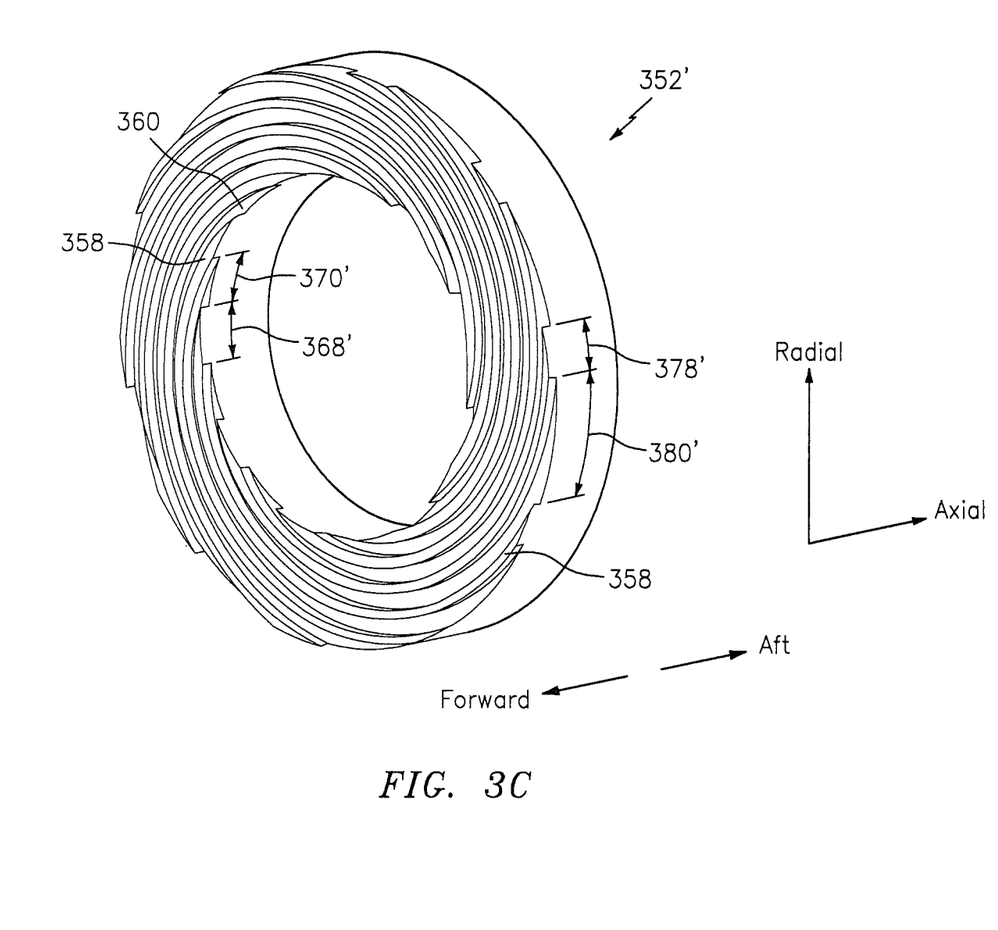
FIG. 3C illustrates an embodiment of an end face that incorporates one or more fins and grooves with the fins and grooves having a variable groove width to pitch ratio.

In contrast to the constant groove width to pitch ratio of the end face 352 of FIG. 3B, FIG. 3C illustrates an embodiment of an end face 352' where the groove width to pitch ratio may vary over a radial span of the end face 352'. For example, in FIG. 3C the fins 358 may have a circumferential width as denoted by arrow 368' and the grooves 360 may have a circumferential width as denoted by arrow 370' at the inner diameter of the end face 352'. At the outer diameter of the end face 352', the fins 358 may have a circumferential width as denoted by arrow 378' and the grooves 360 may have a circumferential width as denoted by arrow 380'.

The groove width to pitch ratio as measured at the inner diameter of the end face 352' may be approximately the same as measured at the inner diameter of the end face 352 of FIG. 2B (e.g., the groove width to pitch ratio as measured at the inner diameter of the end face 352' may be approximately equal to 50%). However, the groove width to pitch ratio as measured at the outer diameter of the end face 352' may be approximately equal to 75%. In the embodiment of FIG. 3C, the groove width to pitch ratio is thus seen as increasing in progressing from the inner diameter of the end face 352' towards the outer diameter of the end face 352' due to, e.g., a widening of the grooves 360 in progressing in a radially outward direction in FIG. 3C.

Figure 3D:
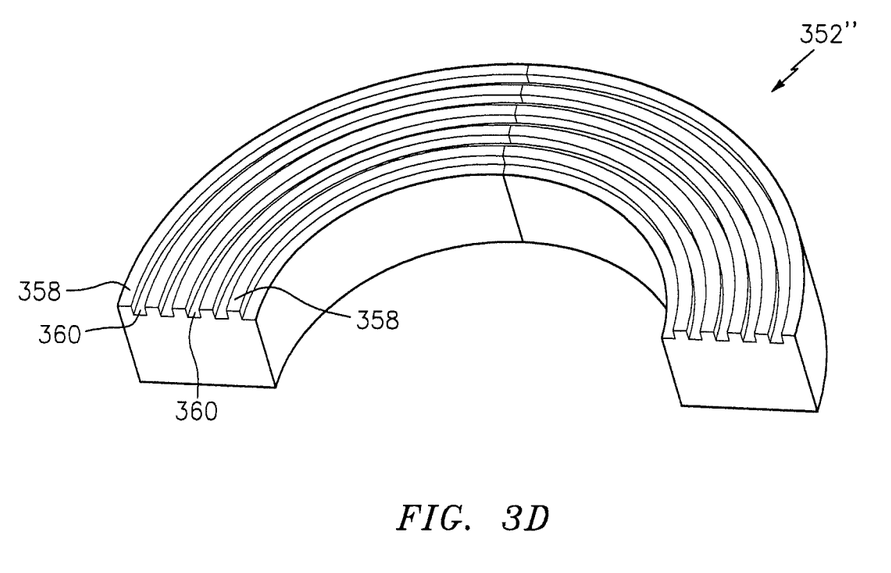
FIG. 3D illustrates an embodiment of an end face that includes continuous loops/hoops of fins and grooves around a circumference of the end face.

FIG. 3D illustrates an embodiment of an end face 352". In contrast to the embodiments shown in FIGS. 3B-3C, the end face 352" is shown as including continuous loops of fins 358 and grooves 360 around the circumference of the end face 352". The end face 352" may be easier to manufacture than the end faces 352 or 352' of FIGS. 3B and 3C, respectively, due to the continuous nature of the fins 358 and the grooves 360.

Figure 3E:
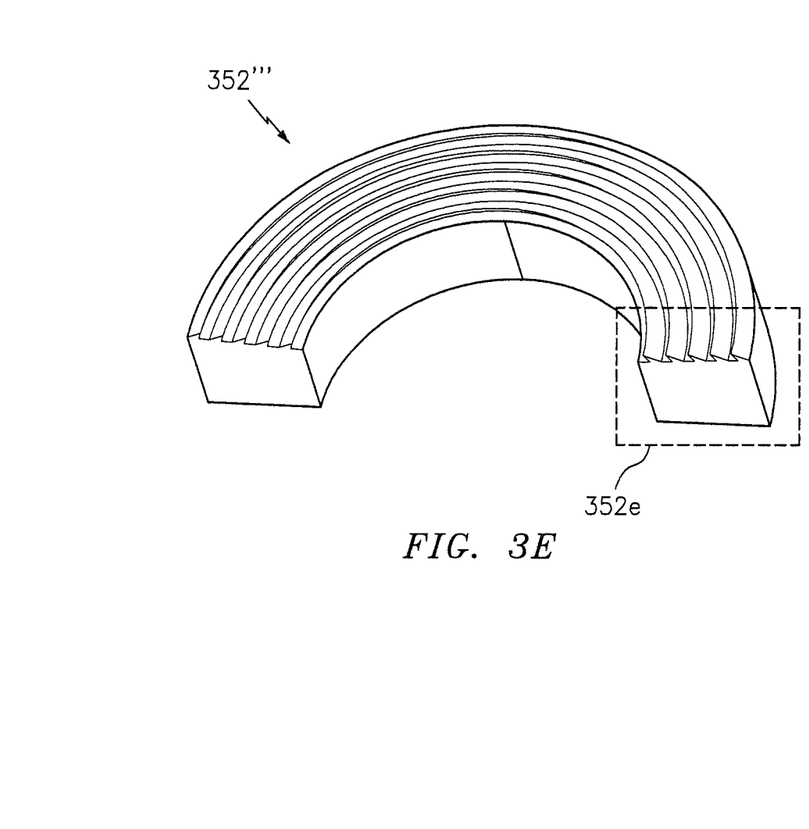
FIG. 3E illustrates an embodiment of an end face that includes saw-toothed shaped fins.
Figure 3F:
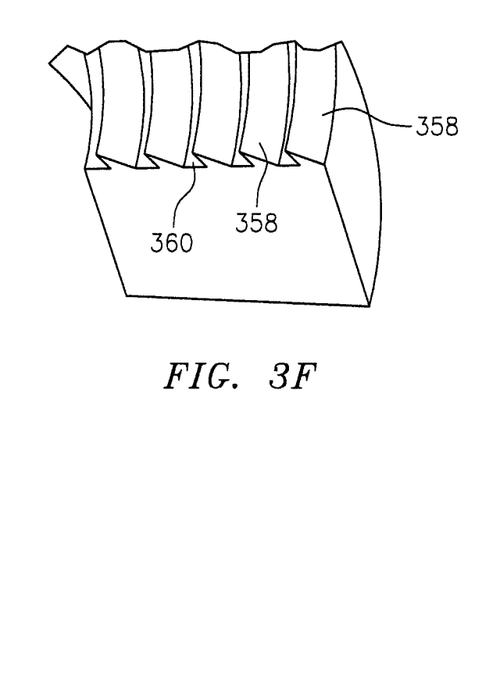
FIG. 3F illustrates a closer, zoomed-in view of a portion of the end face of FIG. 3E.

FIG. 3E illustrates an embodiment of an end face 352'". Much like the end face 352" of FIG. 3D, the end face 352'" of FIG. 3E may include continuous loops of fins 358 and grooves 360 around the circumference of the end face 352'". As reflected in the boxed portion 352e of FIG. 3E (which portion 352e is depicted in a closer, zoomed-in view in FIG. 3F), the fins 358 of the end face 352'" of FIG. 3E may be saw-toothed in shape. The use of the saw-toothed shape for the fins 358 may assist in further entraining/entrapping the cooling fluid in the grooves 360 (relative to, e.g., the embodiments of FIGS. 3B-3D), thereby further enhancing the cooling efficiency/performance.

Figure 3G:
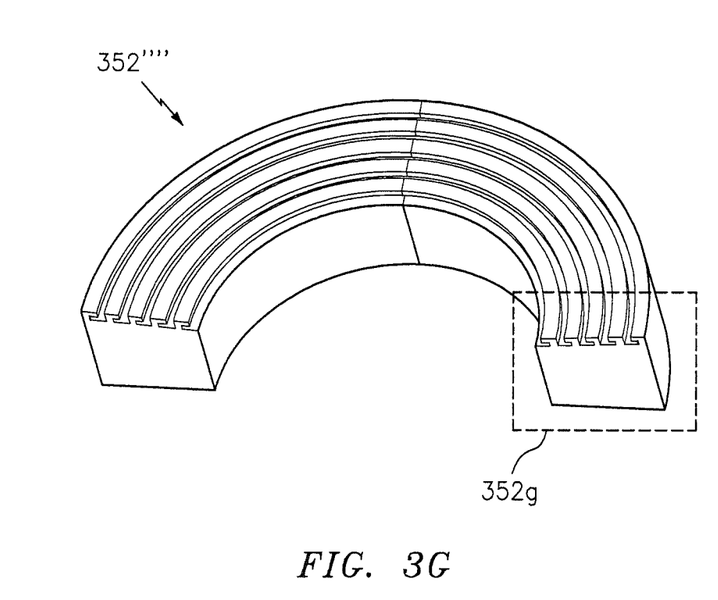
FIG. 3G illustrates an embodiment of an end face that includes L-shaped fins.
Figure 3H:
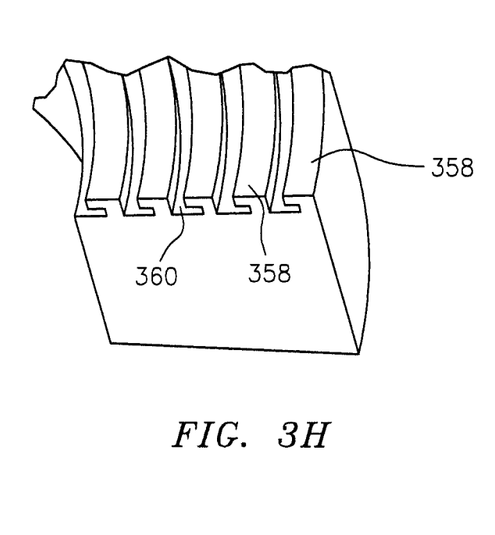
FIG. 3H illustrates a closer, zoomed-in view of a portion of the end face of FIG. 3G.
Figure 3I:
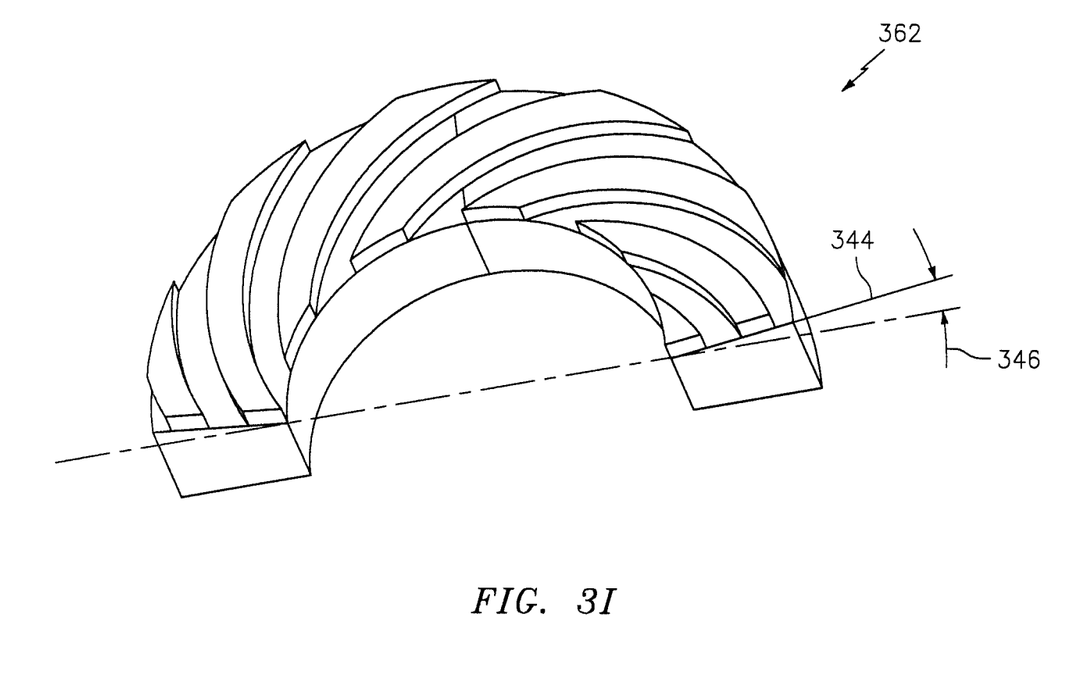
FIG. 3I illustrates a closer, zoomed-in view of an end face that includes a taper/incline.

FIG. 3G illustrates an embodiment of an end face 352"". Much like the end faces of FIGS. 3D and 3E, the end face 352"" of FIG. 3G may include continuous loops of fins 358 and grooves 360 around the circumference of the end face 352"". As reflected in the boxed portion 352g of FIG. 3G (which portion 352g is depicted in a closer, zoomed-in view in FIG. 3H), the fins 358 of the end face 352"" of FIG. 3G may be L-shaped. The use of the L-shaped fins 358 may assist in further entraining/entrapping the cooling fluid in the grooves 360 (relative to, e.g., the saw-toothed shape of FIGS. 3E-3F), thereby further enhancing the cooling efficiency/performance.

As would be appreciated by one of skill in the art, the particular arrangement/parameters (e.g., count of fins or grooves, pitch/width, orientation/direction of the fins or grooves, taper/inclination, etc.) for an end face may be determined in accordance with simulation, testing, analysis, etc. For example, a finite element thermal analysis may be performed to determine and select the particular parameters for a given set of application requirements or performance metrics.

Technical effects and benefits of this disclosure include an axisymmetric (e.g., circumferential and radial) cooling profile for an end face of a seal plate that reduces/eliminates seal plate waviness. A greater surface area coupled with longer dwell times improves cooling effectiveness/efficiency of a cooling fluid (e.g., a lower oil flow rate may be used for the same level/degree of cooling in accordance with aspects of this disclosure). One or more fins or grooves may be included in an end face. The grooves may be milled into the seal plate; such a technique may be inexpensive in terms of operator cost and may impose minimal stress on the seal plate. The particular parameters that are used for an end face may be at least partially based on a trade-off between manufacturing complexity/simplicity on one hand and cooling requirements/effectiveness/efficiency on the other hand.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A sealing system for an engine having an axial centerline, comprising:
    a stationary carbon segment; and
    a seal plate that rotates when the engine is operated;
    wherein the seal plate includes an end face that is opposed to an interface between the carbon segment and the seal plate;
    wherein the end face includes a plurality of grooves that convey a liquid cooling fluid;
    wherein each of the grooves starts at a respective first circumferential location of the end face at an inner diameter of the end face and ends at a respective second circumferential location of the end face at an outer diameter of the end face, the first and second circumferential locations being different circumferential locations;
    wherein the end includes a plurality of fin;
    wherein the grooves and fins are formed in an alternating sequence in the end face;
    wherein the end face has a non-constant groove width to pitch ratio over a radial span of the end face; and
    wherein the groove width to pitch ratio increases from the inner diameter of the end face towards the outer diameter of the end face.

2. A sealing system for an engine having an axial centerline, comprising:
    a sealing segment; and
    a seal plate that rotates when the engine is operated;
    wherein the seal plate includes an end face that is opposed to an interface between the sealing segment and the seal plate;
    wherein the end face includes a groove that conveys a liquid cooling fluid;
    wherein the groove starts at a first circumferential location of the end face at an inner diameter of the end face and ends at a second circumferential location of the end face at an outer diameter of the end face the first and second circumferential locations being different circumferential locations;
    wherein the end face has a non-constant groove width to pitch ratio over a radial span of the end face; and
    wherein the groove width to pitch ratio increases from the inner diameter of the end face towards the outer diameter of the end face.

* * * * *